UNITED STATES PATENT OFFICE.

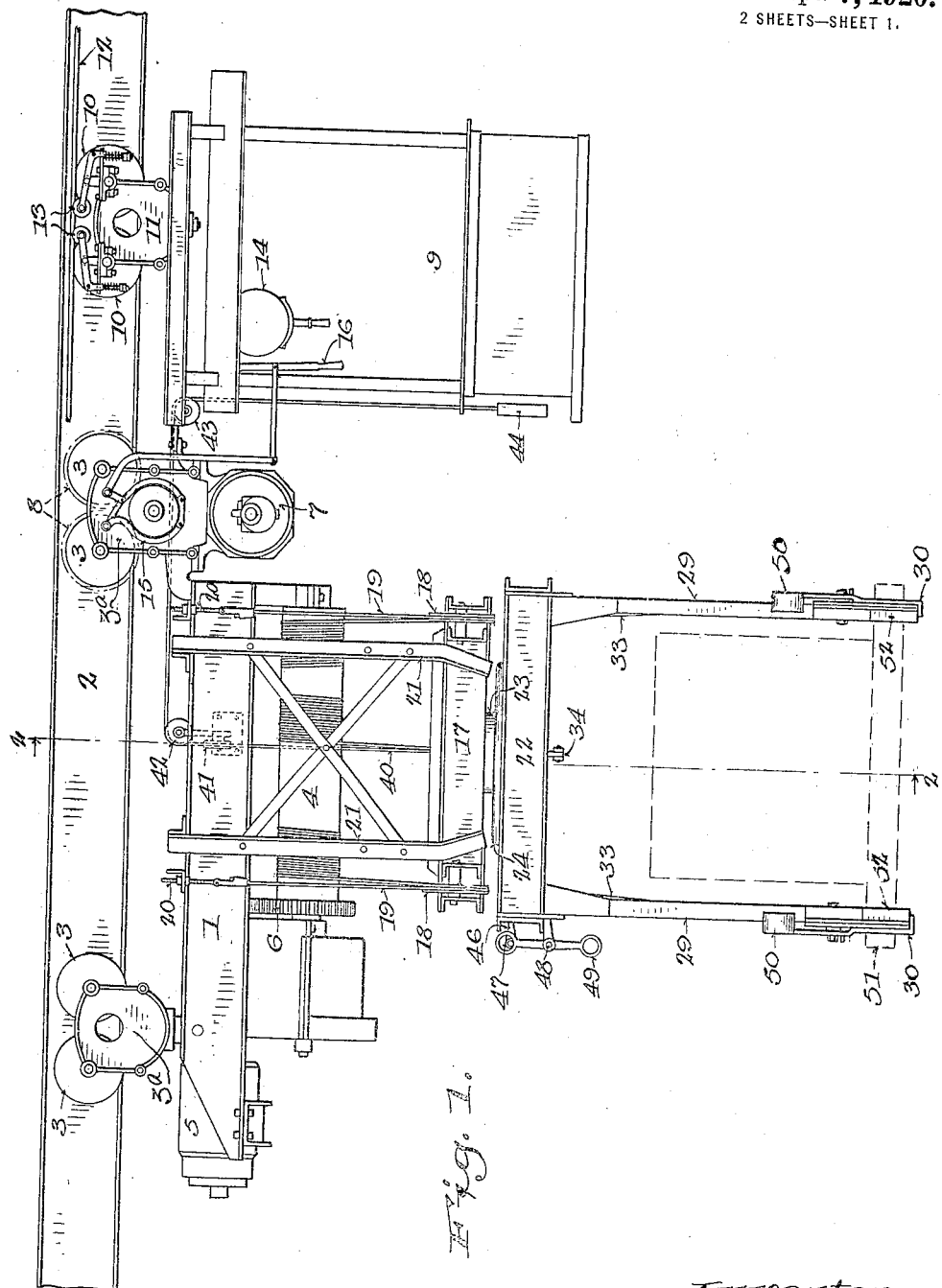

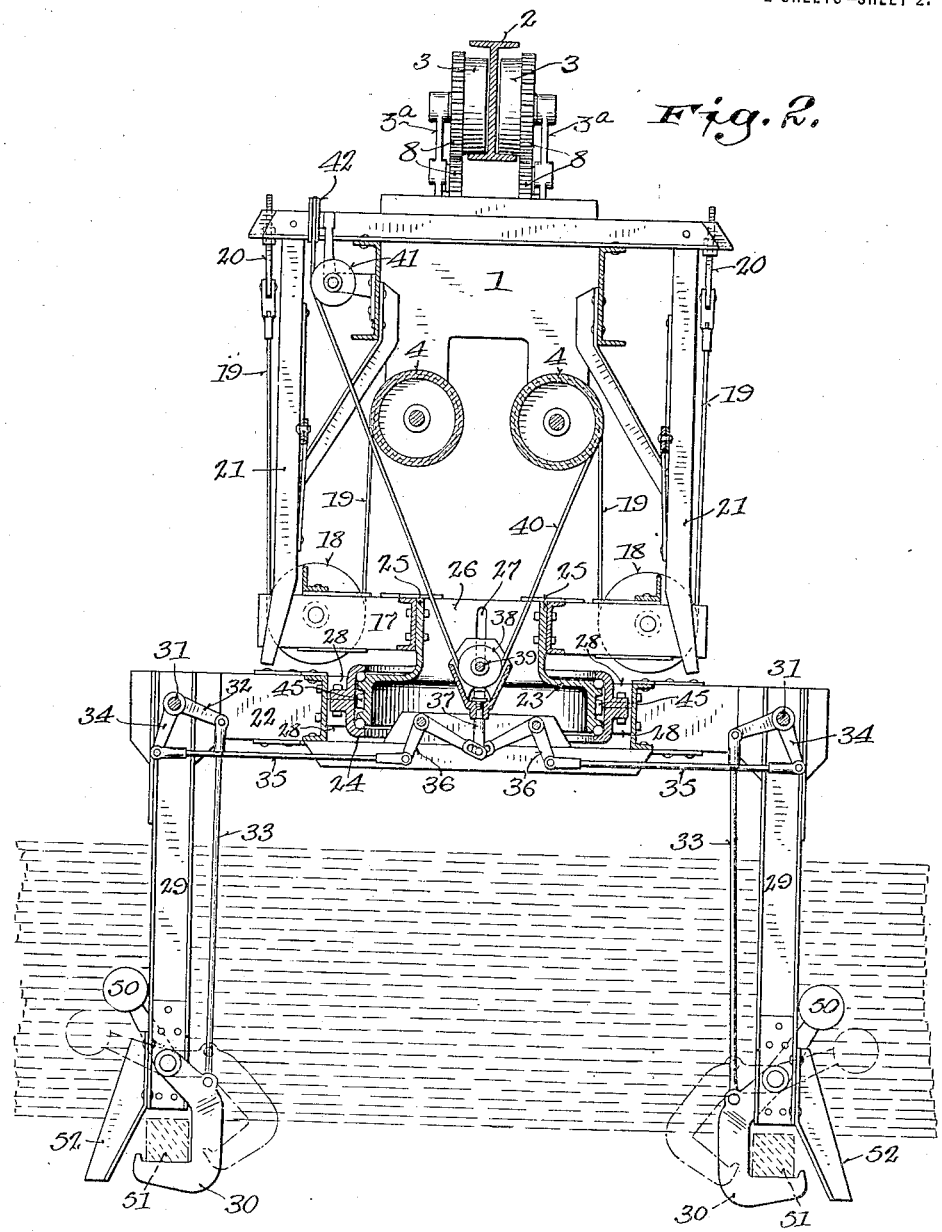

HENRY WEICKEL, OF MILWAUKEE, WISCONSIN, ASSIGNOR TO PAWLING AND HARNISCHFEGER COMPANY, OF MILWAUKEE, WISCONSIN, A CORPORATION OF WISCONSIN.

HOISTING AND CONVEYING APPARATUS.

1,351,882.           Specification of Letters Patent.           Patented Sept. 7, 1920.

Original application filed July 17, 1913, Serial No. 779,442. Divided and this application filed June 3, 1918. Serial No. 237,843.

*To all whom it may concern:*

Be it known that I, HENRY WEICKEL, a citizen of the United States, residing at Milwaukee, in the county of Milwaukee and State of Wisconsin, have invented certain new and useful Improvements in Hoisting and Conveying Apparatus, of which the following is a specification, reference being had to the accompanying drawing, forming a part thereof.

This invention relates particularly to hoists and conveyers of the class shown by United States Letters Patent No. 992,307, dated May 16, 1911, designed to be suspended and to run on an elevated monorail track, for picking up and transferring from place to place various materials such as lumber, and this application is a division of my application Serial No. 779,442, filed July 17, 1913.

The main objects of the invention are to more steadily, stably and evenly support the load and to confine it in place, particularly in making turns or passing curves when the trolley is running from place to place; and generally to improve the construction and operation of apparatus of this class.

It consists in the construction, arrangement and combination of parts as hereinafter particularly described and pointed out in the claims.

In the accompanying drawing like characters designate the same parts in both figures.

Figure 1 is a side elevation of apparatus embodying the invention as specially designed for handling lumber and the like; and Fig. 2 is an enlarged vertical cross section on the line 2—2, Fig. 1.

Referring to Fig. 1, the apparatus comprises a trolley or drum frame 1, adapted to be suspended from an elevated monorail track 2, by wheels 3 and hangers 3ª. The track 2 consists of an I-rail, and the trolley wheels 3 arranged in pairs on opposite sides of its web, are adapted to run on the lower flanges of the rail. Two hoisting drums 4 are mounted in the frame 1 on opposite sides of and parallel with its longitudinal center and equi-distant from the track 2. An electric motor 5, mounted on the frame 1, is connected by suitable gearing 6, with the drums 4 so as to rotate them simultaneously in opposite directions at the same speed and prevent their rotation independently of each other. Another electric motor 7, attached to the frame 1 and connected by gears 8 with one set of wheels 3, serves to propel the trolley along the track 2.

An operator's cage 9, coupled with the trolley frame 1 through the frame of the propelling motor 7, is suspended in like manner from the track 2 by wheels 10 and a hanger 11. Current for operating the motors is taken from a wire or conductor 12 parallel with the track 2 by collectors 13, and the cage is provided with controllers 14 in the motor circuits. The transmission gearing of the propelling motor is provided with a brake 15 connected with a lever 16 in the cage.

A vertically movable lifting frame 17 provided on opposite sides of its longitudinal center and adjacent to its ends with sheaves 18, is suspended from the trolley by cables 19, which are adjustably attached at one end by eye-bolts 20 to the frame 1, passing thence downwardly around the sheaves 18, and attached at their other ends to the drums 4, on which they are adapted to be simultaneously wound and unwound in opposite directions, as shown by Fig. 2.

The cables 19 pass downwardly from the outer sides of the drums 4, thus providing for sufficient distance between the points of suspension of the frame 17 to insure stability of support thereof without unnecessarily separating the drums and widening the trolley frame 1. The drums 4 being compelled to rotate together, the eye-bolts 20 provide means for leveling the lifting frame 17 and maintaining it in proper relation to the trolley frame 1.

For guiding the lifting frame 17 into and holding it securely in place relative to the trolley for carrying a load, especially in passing around curves, the trolley frame is provided with depending stay and guide arms 21, which are inclined at their lower ends outwardly relative to longitudinal members of the lifting frame, as shown in Fig. 2, and inwardly relative to cross members of said frame, as shown in Fig. 1, so that by engagement of said arms with said members the frame when elevated, will be guided into and held in proper position relative to the trolley and the track on which it travels.

The lifting frame is provided with a grapple which may be of any suitable construction according to the nature of the material to be handled.

For example, for handling piled lumber, bar material or the like, the grapple may be constructed as follows:

A frame 22 is suspended from the frame 17 by an annular swivel connection comprising inner and outer rings 23 and 24. The inner ring 23 is formed with upwardly extending attachment plates 25, which are bolted to longitudinal members of the frame 17, and these plates are connected by cross webs 26 formed with vertical slots 27, as shown in Fig. 2. The outer ring 24, which is made in two parts in order to assemble it with the inner ring, is formed on opposite sides with lugs 28, which are bolted to the frame 22.

To facilitate turning the frame 22 with a load suspended therefrom into different positions relative to the trolley and the track on which it travels, the rings 23 and 24 are provided with all bearings, as shown by Fig. 2.

The frame 22 is provided at the corners with legs 29 to which adjacent to their lower ends are pivoted hooks 30. Above and parallel with the pivots of the hooks, rocker shafts 31 are mounted in the frame 22. These shafts are provided adjacent to their ends with horizontally disposed arms 32 which are connected by rods 33 with the hooks 30. The shafts 31 are also provided midway between their ends with depending arms 34, which are connected by rods 35 with the outer downwardly extending arms of bell crank levers 36. The inwardly extending arms of these levers, which are fulcrumed parallel with the shafts 31 on the frame 22 within the ring 23, are connected by a swivel bolt 37 with the block or frame of a vertically movable sheave 38, which is guided and held parallel with the sheaves 18 by its extended journal pin 39 engaging with the slots 27 of the cross webs 26, as shown by Fig. 2.

To enable the operator in the cage 9 to turn the hooks 30 into and out of operative position, a cable 40, attached at one end to one of the drums 4 so as to be wound and unwound simultaneously with the cables 19, passes from said drum downwardly around the sheave 38, thence upwardly around guiding sheaves 41 and 42 on the trolley frame 1, and over a guiding sheave 43 in the upper part of the cage, and is provided at its free end with a counterweight 44 of sufficient size to retain the hooks in place when they are turned inwardly and upwardly into inoperative position, as indicated by dotted lines on Fig. 2.

For locking and holding the hook or grapple frame 22 in different positions relative to the lifting frame 17, the inner swivel ring 23 is formed or provided on the outer side with a number of sockets or keepers 45, preferably four, arranged ninety degrees apart, so as to hold the frame 22 crosswise of the lifting frame 17, trolley frame 1 and track 2, or parallel therewith.

A spring actuated latch pin or bolt 46, guided in one side of the ring 24 and the frame 22, is adapted to automatically engage with any one of the sockets or keepers 45 when it is turned into register therewith. At its outer end the bolt 46 is connected with an arm 47, on a rocker shaft 48 mounted on the frame 22, as shown in Fig. 1, and provided at one end of said frame with a cross arm 49 having eyes at the ends, for turning it with a hand hook held by the operator in the cage 9, to withdraw the latch bolt and turn the frame 22 into different positions.

The hooks 30, which are adapted to gravitate into operative position as shown by full lines in Fig. 2, when the counter-weight 44 on the cable 40 is lifted by the operator, are partially balanced by counterweights 50, to facilitate their operation.

To facilitate bringing the hooks 30 to proper position for engagement with the skids 51 on which a pile of lumber or the like is supported, as indicated by dotted lines in Figs. 1 and 2, the legs 29 are provided on their outer side opposite the hooks with inclined guides 52, which project below the lower ends of the legs and are adapted by engagement with the skids to direct the lower ends of the legs into place on top of the skids, and the hooks into position to be turned underneath the skids into engagement therewith.

In the operation of the apparatus, in handling lumber, for which it is specially designed, the lumber being piled on skids below and transversely to the elevated track 2, and the skids being blocked up from the ground sufficiently to permit the hooks 30 to pass freely underneath them, to pick up a load, the trolley having been brought to a position directly over a pile of lumber and stopped in that position, the lifting frame 17 is lowered by means of the motor 5, which turns the drums 4, the frame 22 having been turned into position so that the legs 29 will straddle the pile, as shown in Fig. 1. As the frames 17 and 22 descend, the operator in the cage pulls down on the cable 40, thereby turning the hooks 30 inwardly and upwardly into position indicated by dotted lines on Fig. 2, to pass below the skids on the inner sides thereof.

When the legs 29 directed into proper position by the inclined guides 52, are seated at their lower ends on the skids 51, the operator pulls up on the cable 40, lifting the counterweight 44 and permitting the hooks to gravitate downwardly and outwardly into operative position underneath the skids, as shown by full lines on Fig. 2. The hoisting mechanism is then set in operation by the operator, the drums 4 being turned in the proper direction to lift the frames 17 and 22 and elevate the load carried by the hooks 30. As the frame 17 passes above the lower ends of the stay and guide arms 21, it is guided into proper position by the inclines at the lower ends of the arms parallel with the trolley frame 1 and the track 2, in which position it is confined by the arms while the load is transferred from one place to another. As the load is lifted with the frames 17 and 22, the hook operating cable 40 is wound on one of the drums 4 simultaneously with and at the same rate as the hoisting cables 19, so that at any elevation of the frame 22 relative to the trolley there will be no slack in the cable 40, and it will always be in condition to operate the hooks 30 by pulling up or down on the end to which the weight 44 is attached.

In transferring the load from one place to another, in order to clear obstructions along the way it may be necessary to turn the frame 22 into a position parallel with the track 2, or for depositing the load in a different position relative to the track from that in which it was taken up, it may be necessary or desirable to turn the hook or grapple frame 22 into different angular positions relative to the lifting frame 17, which is carried constantly parallel with the track. In either case, the operator in the cage 9 with a hand hook caught into the eye at the upper or lower end of the arm 49, rocks the shaft 48 in the proper direction to withdraw the latch bolt 46 from the socket or keeper 45, with which it engages, and then by proper manipulation of the hook still held in engagement with the arm 49, turns the frame 22 into the desired position, in which it may be locked if desired, by engagement of the bolt 46 with another socket or keeper 45.

The load having been transferred to the point where it is to be deposited, is turned by the operator in the cage into the desired position, and then lowered into place with the skids 51 resting on blocks or other supports, so that the hooks 30, engaging with the protruding ends of the skids, will be clear and free and may be turned inwardly and upwardly into inoperative position by pulling down on the weighted end of the cable 40, after the legs 29 are seated at their lower ends on the tops of the skids. The frame 22 is then elevated till the hooks 30 are carried above the load which has been deposited, and if desired, may be turned back into a position parallel with the frame 17 and the track 2, in which position it will be automatically locked by the bolt 46, and may be transferred with the trolley to any point on the track for picking up and transferring another load.

The suspension of the frames 17 and 22 by the two sets of cables 19 from the two drums 4 on opposite sides of and equidistant from the longitudinal center of the trolley frame 1 and track 2, prevents the tipping of an unbalanced load, such as an unevenly piled load of boards, timber or bar material, when it is elevated and transferred, and particularly when the frame 22 with the load suspended therefrom, is turned into a position transverse to the frame 17 and drums 4, as shown in the drawing, and thus tends to avoid collision with obstructions along the way.

Various changes in the details of construction and arrangement of parts of the apparatus may be made without materially affecting its mode of operation and without departing from the principle and scope of the invention as defined in the following claims.

I claim:

1. In hoisting and conveying apparatus the combination of a trolley adapted to be suspended from and to travel on an elevated monorail track and provided on opposite sides of and parallel with its longitudinal center and equidistant from the track with two hoisting drums, a motor connected with said drums and adapted to rotate them simultaneously in opposite directions at the same speed, and prevent independent rotation thereof, and a lifting frame provided with two pairs of sheaves and suspended on opposite sides of its longitudinal center and adjacent its ends from the trolley by four cables passing around said sheaves and attached at their ends to the trolley frame and to said drums, the cables passing downward from the outer sides of the drums to the sheaves.

2. In hoisting and conveying apparatus the combination of a trolley adapted to hang and travel on an elevated monorail track and provided with hoisting drums on opposite sides of and parallel with its longitudinal center and equidistant from the track, a lifting frame provided on opposite sides of its longitudinal center and adjacent to its ends with four sheaves having their axes parallel with the axes of the drums, four cables attached at one end to the trolley frame, passing thence downwardly and inwardly around the sheaves and thence upwardly and inwardly over the drums, to which they are fastened at the other end, a grapple having a swivel connection with the lifting frame, and a motor mounted on the trolley and connected with said drums and adapted to rotate them simultaneously in opposite directions at the same speed and to prevent independent rotation thereof.

3. In hoisting and conveying apparatus the combination of a trolley adapted to hang and travel on an elevated monorail track and provided on opposite sides of and parallel with its longitudinal center and equidistant from the track with hoisting drums, a lifting frame provided on opposite sides of its longitudinal center and adjacent to its ends with sheaves having their axes parallel with the axes of the drums, cables fastened at one end to said drums and passing thence downwardly from the outer sides of the drums around said sheaves and thence upwardly from the outer sides of the sheaves and adjustably fastened at the other end to the trolley frame, a grapple having a swivel connection with the lifting frame, and a motor mounted on the trolley and adapted to turn said drums simultaneously in opposite directions at the same speed and to prevent independent rotation thereof.

In witness whereof I hereto affix my signature.

HENRY WEICKEL.